(12) United States Patent
Streetman

(10) Patent No.: US 8,857,771 B2
(45) Date of Patent: Oct. 14, 2014

(54) CONDUIT ATTACHMENT DEVICE FOR USE WITH A TRAPEZE

(76) Inventor: Randy J. Streetman, Howe, TX (US)

( * ) Notice: Subject to any disclaimer, the term of this patent is extended or adjusted under 35 U.S.C. 154(b) by 800 days.

(21) Appl. No.: 12/562,748

(22) Filed: Sep. 18, 2009

(65) Prior Publication Data

US 2011/0068232 A1 Mar. 24, 2011

(51) Int. Cl.
*F16L 3/24* (2006.01)
*F16L 3/133* (2006.01)

(52) U.S. Cl.
CPC .. *F16L 3/24* (2013.01); *F16L 3/133* (2013.01)
USPC ................ 248/72; 248/74.1; 248/65; 248/58; 248/300; 248/228.1; 248/228.6; 248/229.15; 248/229.25; 248/230.6; 248/231.71

(58) Field of Classification Search
USPC ........ 248/74.1, 65, 58, 72, 300, 228.1, 228.6, 248/229.15, 229.25, 230.6, 231.71
See application file for complete search history.

(56) References Cited

U.S. PATENT DOCUMENTS

| | | | | |
|---|---|---|---|---|
| 1,680,568 A * | 8/1928 | Pollak | ............................ | 200/540 |
| 2,398,306 A * | 4/1946 | Hermanson | .................... | 403/385 |
| 2,642,243 A * | 6/1953 | Kindorf | ............................ | 248/72 |
| 2,659,561 A * | 11/1953 | Kindorf | ...................... | 248/228.6 |
| 2,963,251 A * | 12/1960 | Fuss | ............................ | 248/228.1 |
| 2,996,570 A * | 8/1961 | Wilson | ......................... | 174/163 F |
| 3,129,915 A * | 4/1964 | Budnick | ........................... | 248/72 |
| 3,131,900 A * | 5/1964 | Anderson et al. | ............. | 248/210 |
| 3,341,909 A * | 9/1967 | Havener | ........................... | 24/486 |
| 4,570,885 A * | 2/1986 | Heath | .............................. | 248/72 |
| 4,666,116 A * | 5/1987 | Lloyd | ......................... | 248/228.6 |
| 5,326,059 A * | 7/1994 | Pryor et al. | .............. | 248/231.71 |
| 6,079,678 A * | 6/2000 | Schott et al. | .............. | 248/229.15 |
| 6,098,942 A * | 8/2000 | Heath | ......................... | 248/228.6 |
| 6,254,040 B1 * | 7/2001 | Mc Grath | ......................... | 248/62 |
| 7,614,590 B2 * | 11/2009 | Boville | ........................... | 248/72 |
| 2005/0072883 A1 * | 4/2005 | Michaud et al. | ............. | 248/74.1 |
| 2008/0296454 A1 * | 12/2008 | Carnevali | ................. | 248/231.71 |
| 2009/0183463 A1 * | 7/2009 | Osborn et al. | ............. | 52/745.21 |

* cited by examiner

*Primary Examiner* — Terrell McKinnon
*Assistant Examiner* — Michael McDuffie
(74) *Attorney, Agent, or Firm* — Scott T. Griggs; Griggs Bergen LLP

(57) ABSTRACT

A conduit attachment device is disclosed for use with a trapeze for providing for the placement and suspension of apparatus between existing structural members of an overhead structure. In one embodiment, the conduit attachment device includes a body having four sides formed of a continuous sheet with three bends in an open-ended rectangular box design. A fastening join joins two sides of the continuous sheet. A window including first and second substantially continuous U-shaped engagement surfaces adapted to form a friction fit with a conduit is located at one of the ends. Two sizes of threaded openings are located on opposite sides of the body for mating with two different sizes of threaded suspension rod. Another threaded opening is located in the body for mating with a set screw that further secures the conduit.

12 Claims, 4 Drawing Sheets

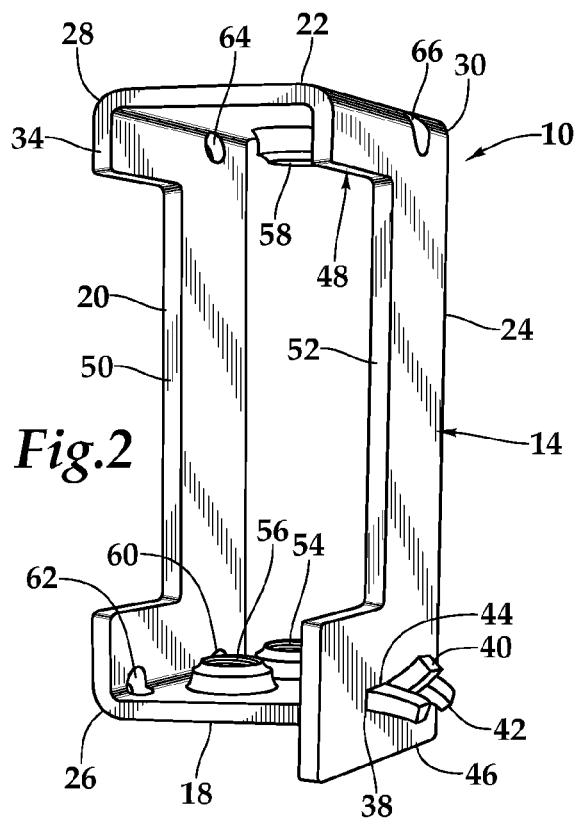
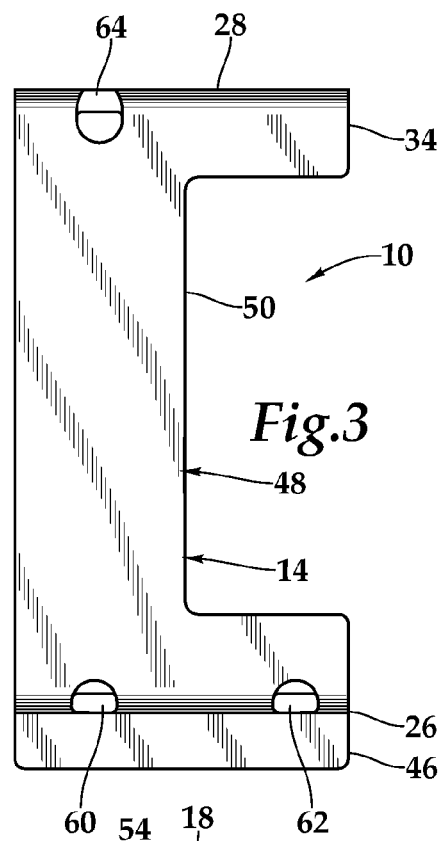
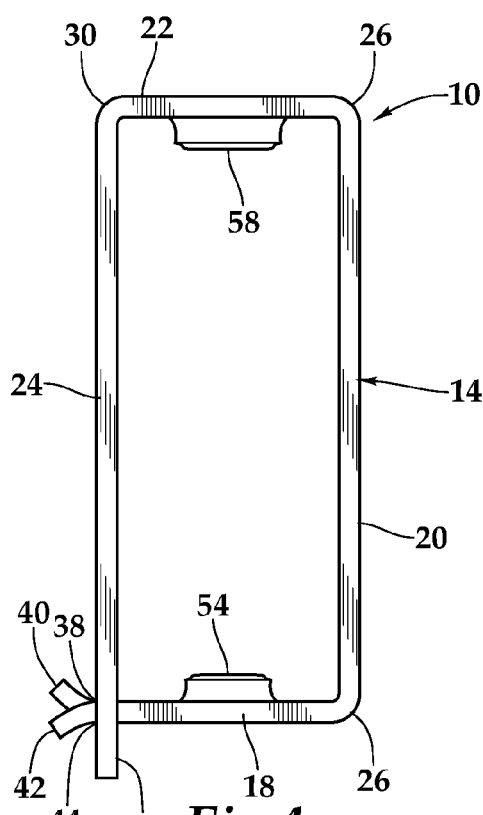
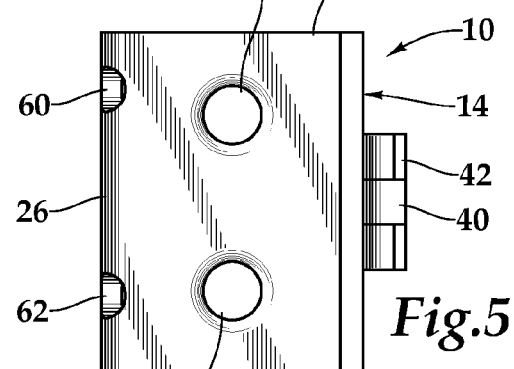
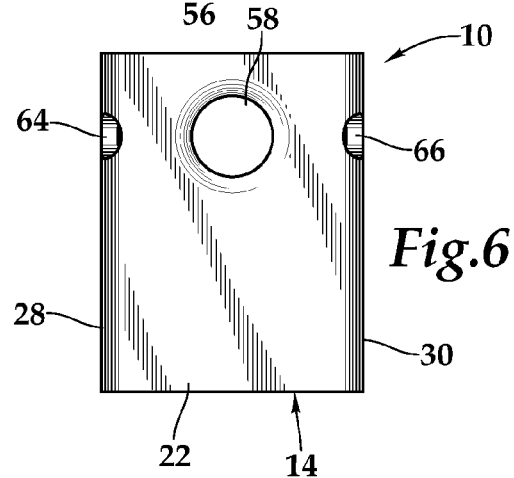

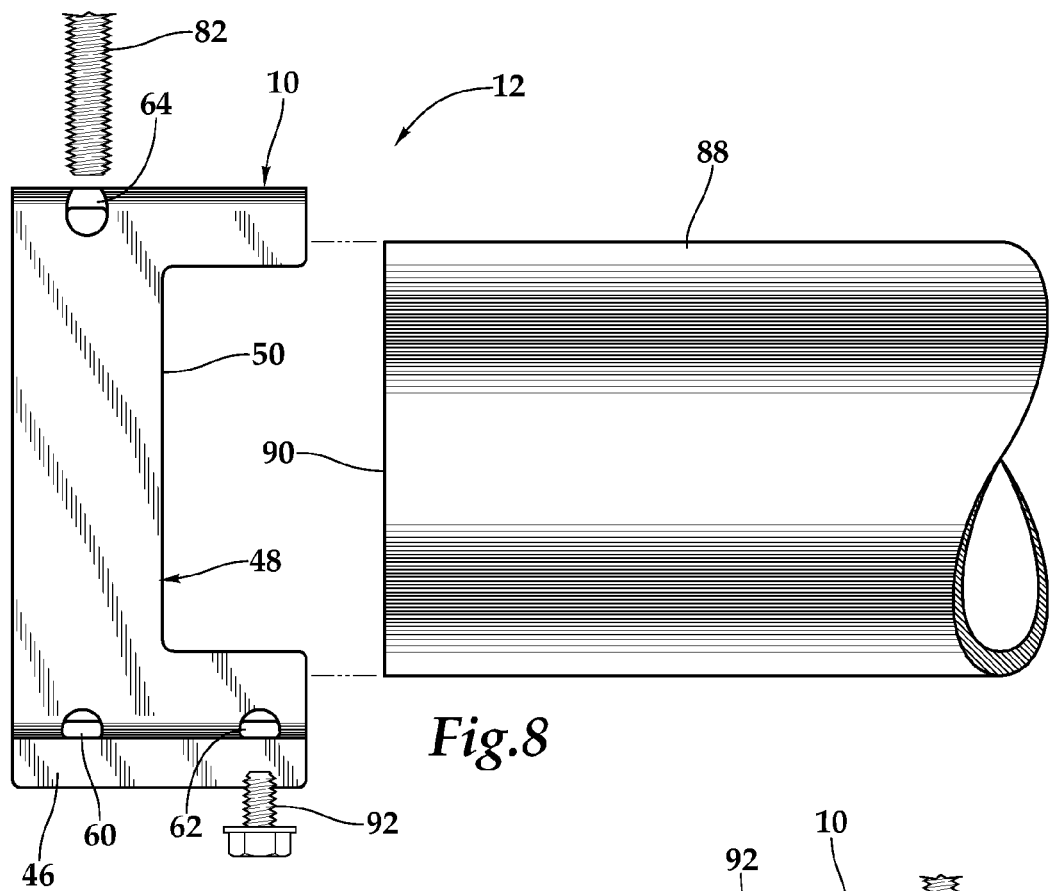
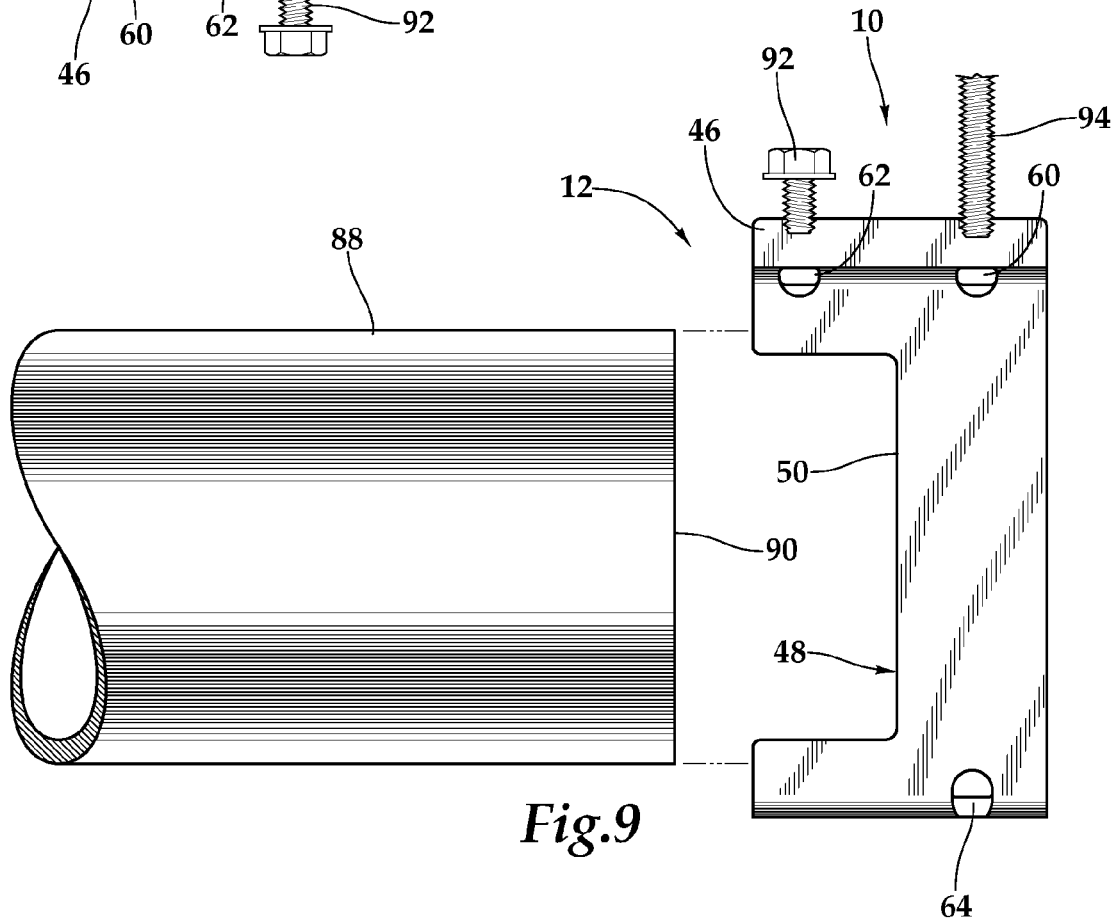

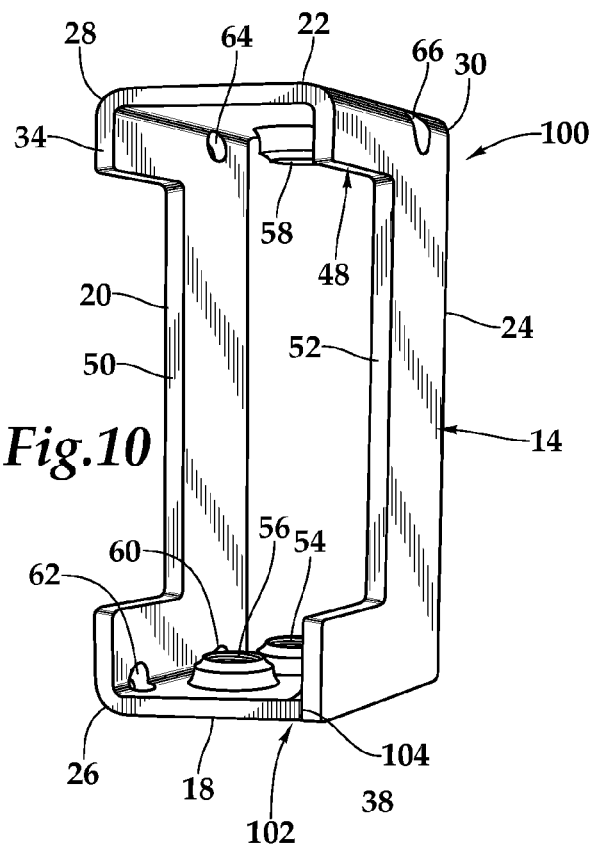
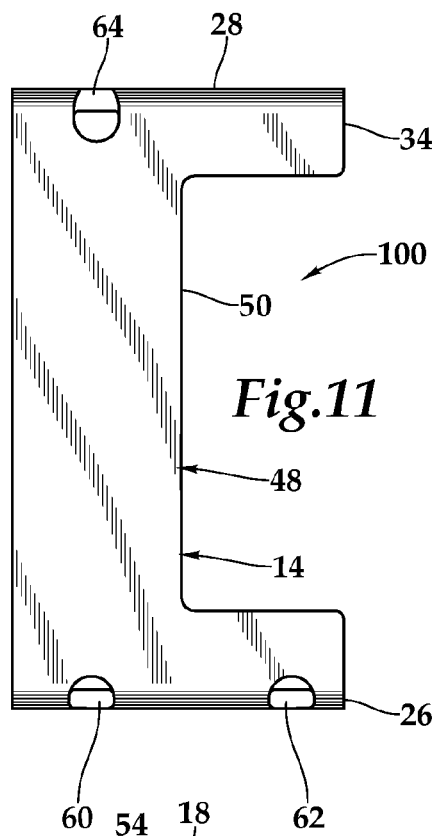
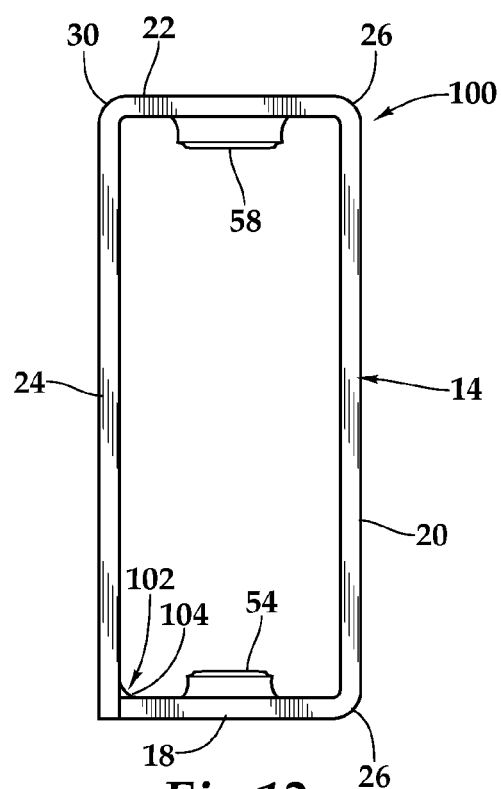
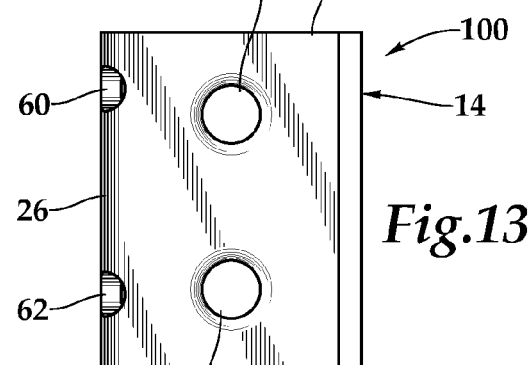
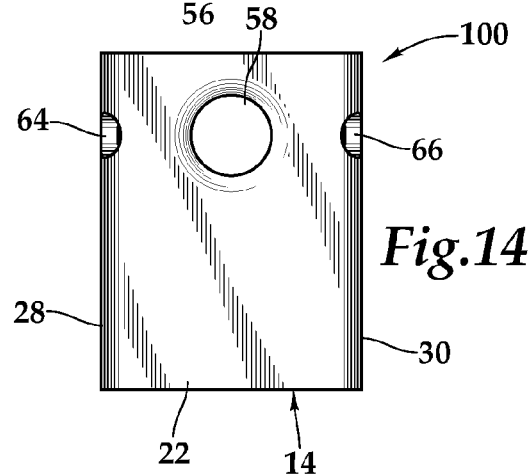

US 8,857,771 B2

CONDUIT ATTACHMENT DEVICE FOR USE WITH A TRAPEZE

TECHNICAL FIELD OF THE INVENTION

This invention relates, in general, to suspension technology within buildings, and, in particular, to a conduit header attachment and conduit supporting structure or trapeze using the same that create the substructure necessary for the placement and suspension of apparatus between existing structural members of buildings.

BACKGROUND OF THE INVENTION

With reference to FIG. 1 (prior art), a typical conduit supporting structure, commonly referred to as a trapeze because of its appearance, consists of at least two suspension members spaced apart from each other and extending downwardly from respective structural members that form portions of an overhead structure, such as a roof or floor deck. A conduit is attached at or near the lower ends of the suspension members in a horizontal position to provide a structure that spans the space between the respective structural members so that a stable substructure of convenient length and sufficient strength is furnished for the coupling of various apparatus, such as pipe or conduit, including sprinkler heads, thereto.

That is, essentially, the trapeze creates the substructure necessary for the placement and suspension of apparatus between existing structural members. In this regard, it is important that the trapeze be held in a fixed position. Beam clamps, threaded suspension rods, and hanger rings are used to suspend each end of the conduit from the respective structural members. Additionally, typically, a short section of threaded suspension rod is welded to each end of the conduit, as a prophylactic measure, to prevent the hanger rings from inadvertently sliding and becoming disengaged from the conduit. As shown in FIG. 1 (prior art), on each side some six inches of conduit is located between the hanger ring and conduit end.

SUMMARY OF THE INVENTION

A conduit attachment device is disclosed for use with a trapeze for providing for the placement and suspension of apparatus between existing structural members of an overhead structure. In one embodiment, the conduit attachment device includes a body having four sides formed of a continuous sheet with three bends in an open-ended rectangular box design. A fastening joint, which may be slot and tab arrangement or a weld, joins two of the sides at a joint. A window including first and second substantially continuous U-shaped engagement surfaces adapted to form a friction fit with a conduit is located at one of the ends. Two sizes of threaded openings are located on opposite sides of the body for mating with two different sizes of threaded suspension rod. Another threaded opening is located in the body for mating with a set screw that further secures the conduit.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a front perspective view of one embodiment of the conduit header attachment of the trapeze construction in accordance with the teachings presented herein;

FIG. 3 is a side view of the conduit header attachment of the trapeze of FIG. 2;

FIG. 4 is a rear view of the conduit header attachment of the trapeze of FIG. 2;

FIG. 5 is a top view of the conduit header attachment of the trapeze of FIG. 2;

FIG. 6 is a bottom view of the conduit header attachment of the trapeze of FIG. 2;

FIG. 8 is an exploded side view illustrating a portion of the construction of the trapeze of FIG. 7 in further detail;

FIG. 9 is an exploded side view illustrating an alternate embodiment of the construction of a trapeze;

FIG. 10 is a front perspective view of another embodiment of the conduit header attachment of the trapeze construction in accordance with the teachings presented herein;

FIG. 11 is a side view of the conduit header attachment of the trapeze of FIG. 10;

FIG. 12 is a rear view of the conduit header attachment of the trapeze of FIG. 10;

FIG. 13 is a top view of the conduit header attachment of the trapeze of FIG. 10; and FIG. 14 is a bottom view of the conduit header attachment of the trapeze of FIG. 10.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 7:
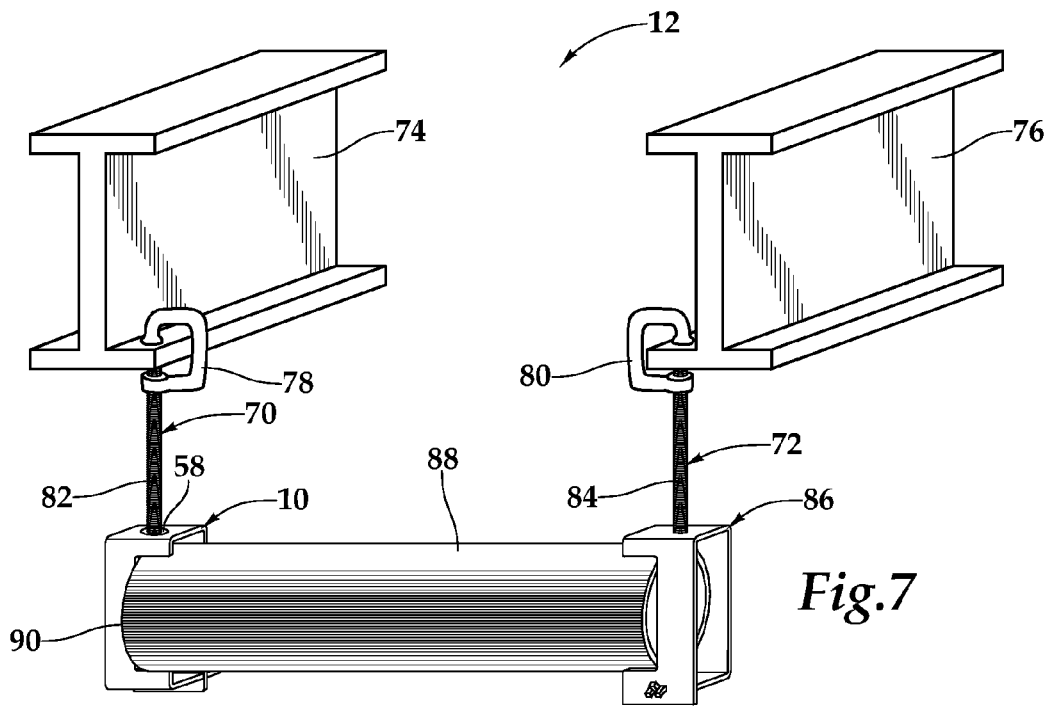
FIG. 7 is a front prospective view of one embodiment of a trapeze constructed in accordance with the teachings presented herein.

Referring initially to FIGS. 2 through 6, therein is depicted one embodiment of the conduit attachment device 10 for use with a trapeze 12 (See FIGS. 7-8). A body 14 is formed of a continuous sheet 16 that includes four sides 18, 20, 22, 24 having three bends 26, 28, 30 to define an open-ended rectangular box 32 having two ends 34, 36. A slot 38, which may be punched, forms a mortise in the side 24. A tab 40 extends from the side 18 to form a through tenon which is locked in a mating engagement with the slot 38. In one implementation, the tab 40 may be sheared and the portion of the tab 40 extending through and beyond the slot 38, bent to cause a modified geometry. As shown, the modified geometry includes three sheared teeth 42 alternating in angle to form a rigid joint 44. The tab 40 and the slot 38 bisect the side and the tab 40 intersects the slot 38 substantially perpendicularly such that a shoulder 46 is formed on the side 24. As shown, the body 14 may be of a generally rectangular-cubic shape with the length of sides 20, 24 greater than the width of sides 18, 22 and, in one embodiment, a construction that is weld-free.

A window 48 is formed at the end 34 in the sides 20,24 to furnish two substantially continuous U-shaped engagement surfaces 50, 52. As will be discussed in further detail hereinbelow, the U-shaped engagement surfaces 50, 52 are sized to engage a conduit or pipe header. The window 48 is sized to mate in a friction fit with the outer diameter of the conduit. In this regard, the body 14 of the conduit attachment device 10 and the window 48 may be available in different sizes corresponding to the typical sizes of conduit and particular uses. By way of example and not by way of limitation, the conduit may have a nominal size of 2", 2½", or 3" with respective outer diameters of 2⅜", 2⅞", and 3½" and the window 48 is approximately sized for abutting engagement therewith.

Two threaded openings 54, 56 are located in the side 18 and one threaded opening 58 is located in the side 22. In one implementation, the threaded openings 54, 58 are adapted to accept threaded suspension rods of ⅜" and ½" diameters, respectively. The threaded opening 56 is adapted to accept a set screw which may also be of ⅜" diameter. The threaded openings 54, 56, 58 may be formed by punching and extrusion. Relief openings 60, 62 are located at the bend 26 and adjacent to the threaded openings 54, 56. Similarly, relief openings 64, 66 are located at the respective bends 28, 30 adjacent to the threaded opening 58. The relief openings 60, 62, 64, 66 relieve the force caused during bending of the continuous sheet 16 and the creation of the bends to prevent the deformation of the threaded openings 54, 56, 58.

In one embodiment, the body 14 of the conduit attachment device 10 is formed of 10 gauge cold rolled steel sheets that are bent and manufactured as discussed above. It should be appreciated, however, that a particular design and build with particular dimensions, shapes, and materials are presented hereinabove, variations are within the teachings provided herein.

FIGS. 7-8 depict the conduit support or trapeze 12 and the construction thereof. The trapeze 12 is suspended from an overhead structure 68, such as a roof or deck floor. Two suspension members 70, 72 are spaced apart from each other and extending downwardly from respective structural members 74, 76 that are depicted as I-beams. It should be appreciated that although I-beams are depicted, the trapeze 12 may be hanging from any type of beams including H-beams, C-beams, and Z-beams, for example.

The suspension members 70, 72 include beam clamps 78, 80 that are releasably secured to respective flanges of the I-beams 74, 76. Suspension means are utilized, which, in this embodiment, include threaded suspension rods 82, 84, or all-threads. The upper ends of the threaded suspension rods 82, 84 are threaded into the beam clamps 78, 80, respectively. The ends of the threaded suspension rods are threaded into the conduit attachment devices 10, 86. It should be understood that conduit attachment device 86 is of similar construction to conduit attachment device 10. By way of illustration, with respect to conduit attachment device 10, the lower end of the threaded suspension rod 82 is threaded into a mating engagement with the threaded opening 58, which is adapted and sized to accept a larger diameter suspension rod.

A conduit 88 is attached at or near the lower ends of the suspension members 70, 72 and suspended in a horizontal position. The conduit attachment devices 10, 86 securely hold the conduit 88 in position. With respect to conduit attachment device 10, an end 90 of the conduit 88 or a pipe header engages in a friction fit and abutting engagement with the U-shaped engagement surfaces 50, 52 of the conduit attachment device 10. A set screw 92 is threaded through the threaded opening 56 and into contact with the conduit 88 to further secure the conduit 88 in position.

FIG. 9 depicts an alternate embodiment of the construction of a trapeze 12. As shown, the conduit 88 engages the U-shaped surfaces 50, 52 of the conduit attachment device 10. The conduit attachment device 10 is inverted, however, and the threaded opening 58 is positioned more proximate to the structural member 74 such that the threaded suspension rod 94, which is of a smaller diameter than the suspension rod 82, threads into mating engagement with the threaded opening 58 and the set screw 92 mates with the threaded opening 56. The use of the two threaded openings, threaded openings 54, 58, therefore enables a single conduit attachment device 10 to interface with two different sizes of threaded suspension rods.

Figure 1:
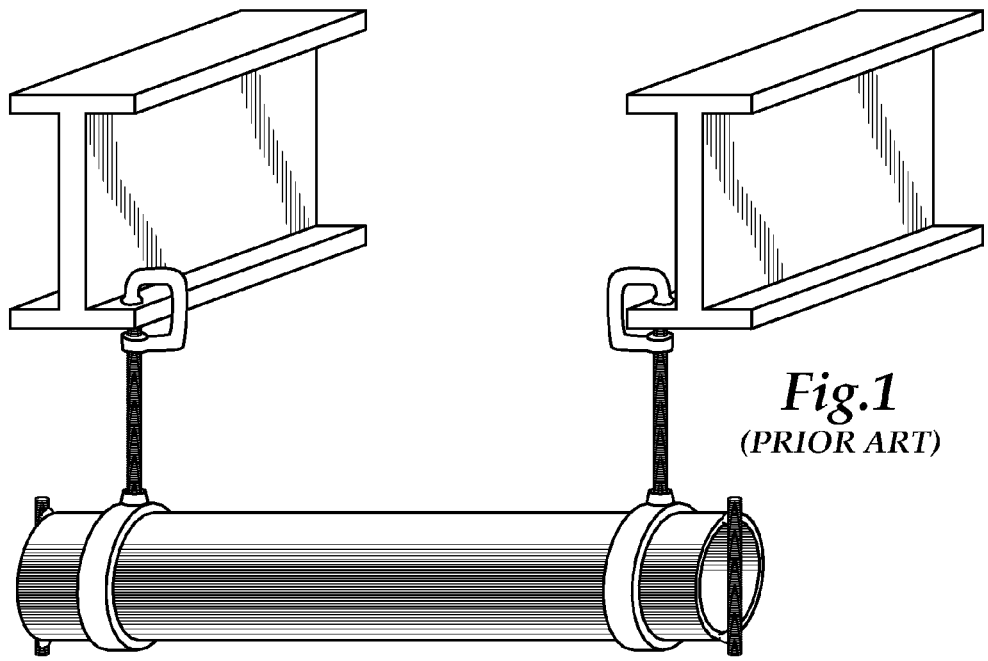
FIG. 1 (prior art) is a front perspective view of a prior art trapeze.

The trapeze 12 provides a structure that spans the space between the respective structural members so that a stable substructure of convenient length and sufficient strength is furnished for the coupling of various apparatus, such as pipe or conduit, including sprinkler heads, thereto. With the use of the conduit attachment device presented herein, the length of conduit required is minimized. With reference to FIG. 1 (prior art) and FIG. 7, the conduit attachment device eliminates the excess piping found in existing arrangements at each end. In fact, in many applications, 6" at each end of the conduit may be saved. Moreover, with the use of the conduit attachment device, it is not necessary to weld a threaded suspension rod or other object to the end of the conduit to prevent the hanger ring from sliding off the conduit as the hanger ring is eliminated. One skilled in the art will appreciate the savings in time and money the conduit attachment device provides.

Referring now to FIGS. 10 through 14, therein is depicted another embodiment of the conduit attachment device 100 for use with a trapeze 12 (See FIGS. 7-8). As will be appreciated, the conduit attachment device 100 has many of the same structures as the conduit attachment device 10, presented in FIGS. 2 through 6, and may be similarly used. A fastening joint 102 secures the side 18 to the side 24. By way of example, the fastening joint 102 may include a slot formed in the fourth side and a tab formed in the first side as described with conduit attachment device 10. By way of further example, as shown, the fastening joint 102 may include a welded joint 104 mating the side 18 or the end thereof to the side 24. In one implementation, the side 18 forms approximately a square corner with the side 14. It should be appreciated that in an alternative embodiment the side 24 or end thereof is welded to side 18.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A conduit attachment device arrangement for use with a trapeze for providing for the placement and suspension of apparatus between existing structural members of an overhead structure, the conduit attachment device arrangement comprising:

first and second conduit attachment devices, each of the first and second conduit attachment devices including:
   a body formed of a continuous sheet, the body consisting of first, second, and third bends that define first, second, third, and fourth sides forming an open-ended rectangular box having first and second ends, the first bend being at a junction of the first and second sides, the second bend being at a junction of the second and third sides, and the third bend being at a junction of the third and fourth sides, the first and third sides being substantially parallel, the second and fourth sides being substantially parallel;
   a fastening joint securing the first side to the fourth side;
   a window formed in the second and third sides at the first end, the window including first and second substantially continuous U-shaped engagement surfaces adapted to form a friction fit with a conduit;

a first threaded opening located through the first side, the first threaded opening adapted to mate with a threaded suspension rod of a first size;

a second threaded opening located through the first side, the second threaded opening adapted to mate with a set screw;

a third threaded opening located in the third side, the third threaded opening adapted to accept a suspension rod of a second size;

first and second relief openings located at the first bend, the first and second relief openings being respectively adjacent to the first and second threaded openings;

third and fourth relief openings respectively located at the second and third bends adjacent to the third threaded opening;

each of the windows of the first and second conduit attachment devices coupled to respective ends of the conduit; and the trapeze including first and second suspension rods, the first and second suspension rods being respectively coupled the first and second conduit attachment devices by one of the first threaded opening, a second threaded opening, and a third threaded opening of the respective first and second conduit attachment devices.

2. The conduit attachment device arrangement as recited in claim 1, wherein the first threaded opening comprises a size to mate with ⅜" threaded suspension rod.

3. The conduit attachment device arrangement as recited in claim 1, wherein the second threaded opening comprises a size to mate with ⅜" set screws.

4. The conduit attachment device arrangement as recited in claim 1, wherein the third threaded opening comprises a size to mate with ½" threaded suspension rod.

5. The conduit attachment device arrangement as recited in claim 1, wherein the continuous sheet comprises 10 gauge cold rolled steel.

6. The conduit attachment device arrangement as recited in claim 1, wherein the fastening joint further comprises a welded joint mating the first side to the fourth side.

7. A conduit attachment device arrangement for use with a trapeze for providing for the placement and suspension of apparatus between existing structural members of an overhead structure, the conduit attachment device arrangement comprising:

first and second conduit attachment devices, each of the first and second conduit attachment devices including:
a body formed of a continuous sheet, the body consisting of first, second, and third bends that define first, second, third, and fourth sides forming an open-ended rectangular box having first and second ends, the first bend being at a junction of the first and second sides, the second bend being at a junction of the second and third sides, and the third bend being at a junction of the third and fourth sides, the first and third sides being substantially parallel, the second and fourth sides being substantially parallel;

a welded joint mating the first side to the fourth side;

a window formed in the second and third sides at the first end, the window including first and second substantially continuous U-shaped engagement surfaces adapted to form a friction fit with a conduit;

a first threaded opening located through the first side, the first threaded opening adapted to mate with a threaded suspension rod of a first size;

a second threaded opening located through the first side, the second threaded opening adapted to mate with a set screw;

a third threaded opening located in the third side, the third threaded opening adapted to accept a suspension rod of a second size;

each of the windows of the first and second conduit attachment devices coupled to respective ends of the conduit; and the trapeze including first and second suspension rods, the first and second suspension rods being respectively coupled the first and second conduit attachment devices by one of the first threaded opening, a second threaded opening, and a third threaded opening of the respective first and second conduit attachment devices.

8. The conduit attachment device arrangement as recited in claim 7, further comprising first and second relief openings located at the first bend, the first and second relief openings being respectively adjacent to the first and second threaded openings.

9. The conduit attachment device arrangement as recited in claim 7, further comprising third and fourth relief openings respectively located at the second and third bends adjacent to the third threaded opening.

10. The conduit attachment device arrangement as recited in claim 7, wherein the first threaded opening comprises a size to mate with ⅜" threaded suspension rod.

11. The conduit attachment device arrangement as recited in claim 7, wherein the second threaded opening comprises a size to mate with ⅜" set screws.

12. The conduit attachment device arrangement as recited in claim 7, wherein the third threaded opening comprises a size to mate with ½" threaded suspension rod.

* * * * *